(No Model.) 9 Sheets—Sheet 1.

G. F. McKENNEY.
KNITTING MACHINE.

No. 488,575. Patented Dec. 27, 1892.

Fig.1.

WITNESSES:
H. A. Hall.
Jonathan Tilly

INVENTOR:
Geo. F. McKenney
by
Might, Brown & Cowsley
Attys.

(No Model.) 9 Sheets—Sheet 3.

G. F. McKENNEY.
KNITTING MACHINE.

No. 488,575. Patented Dec. 27, 1892.

WITNESSES: H. A. Hall.

INVENTOR: Geo. F. McKenney (No Model.) 9 Sheets—Sheet 4.
G. F. McKENNEY.
KNITTING MACHINE.

No. 488,575. Patented Dec. 27, 1892.

WITNESSES:
H. A. Hall.
J. Matthew Tilly

INVENTOR:
Geo. F. McKenney
by
Wright, Brown & Crossley
Attys.

(No Model.) 9 Sheets—Sheet 5.

G. F. McKENNEY.
KNITTING MACHINE.

No. 488,575. Patented Dec. 27, 1892.

WITNESSES:
H. A. Hall.

INVENTOR:
Geo. F. McKenney,
by
Wright, Brown & Crossley,
Attys.

(No Model.) 9 Sheets—Sheet 6.

G. F. McKENNEY.
KNITTING MACHINE.

No. 488,575. Patented Dec. 27, 1892.

WITNESSES:
K. A. Hall.

INVENTOR:
Geo. F. McKenney,
by
Might, Brown & Crossley,
Attys.

(No Model.) 9 Sheets—Sheet 7.

G. F. McKENNEY.
KNITTING MACHINE.

No. 488,575. Patented Dec. 27, 1892.

WITNESSES:
H. A. Hall.
Jonathan Alley

INVENTOR:
Geo. F. McKenney.
by
Wright, Brown & Crossley.
Attys.

(No Model.) 9 Sheets—Sheet 8.

G. F. McKENNEY.
KNITTING MACHINE.

No. 488,575. Patented Dec. 27, 1892.

WITNESSES:
H. A. Hall.

INVENTOR:
Geo. F. McKenney.
by
Might, Brown & Crossley,
Attys.

(No Model.) 9 Sheets—Sheet 9.
G. F. McKENNEY.
KNITTING MACHINE.

No. 488,575. Patented Dec. 27, 1892.

WITNESSES:
H. A. Hall.
Jonath Ully

INVENTOR:
Geo. F. McKenney,
by
Might, Brown & Crosley,
Attys.

UNITED STATES PATENT OFFICE.

GEORGE F. McKENNEY, OF LACONIA, ASSIGNOR TO ORISON TWOMBLY, OF LAKEPORT, NEW HAMPSHIRE.

KNITTING-MACHINE.

SPECIFICATION forming part of Letters Patent No. 488,575, dated December 27, 1892.

Application filed March 28, 1892. Serial No. 426,723. (No model.)

*To all whom it may concern:*

Be it known that I, GEORGE F. MCKENNEY, of Laconia, in the county of Belknap and State of New Hampshire, have invented certain new and useful Improvements in Knitting-Machines, of which the following is a specification.

My invention has relation to circular knitting machines adapted to the production of seamless stockings and half hose having round heels; and it is the object of my improvements to provide a machine which shall be adapted to automatically knit a complete stocking without stopping after the work shall have been set up thereon and the machine started.

My improvements have been wrought upon the machine shown and described in United States Letters Patent No. 335,587, granted February 9, 1886, though it will appear obvious from the description hereinafter given that portions of the invention may be employed upon knitting machines of different kinds.

My invention consists: First, of improvements whereby the motion of the cam cylinder is changed from a rotary to a rotary reciprocating movement. Second, of improvements for effecting the rotary-reciprocating movement of the cam cylinder. Third, of improvements for effecting the throwing out of operation of substantially one-half of the needles in the circle upon beginning the knitting of heel-and-toe work. Fourth, of improvements for effecting narrowing in the production of heel-and-toe work. Fifth, of improvements for effecting widening in the production of heel-and-toe work. Sixth, of improvements for effecting the return to the knitting of circular or tubular work after a heel or toe shall have been completed.

Reference is to be had to the annexed drawings, and to the letters marked thereon forming a part of this specification, the same letters designating the same parts or features, as the case may be, wherever they occur.

Of the said drawings.

In the drawings: $a$ designates the base of the machine which may be supported on legs $b$ or other suitable means.

$c$ is the base ring connected with the base $a$ and adapted to support the needle cylinder $d$ which is connected therewith and provided externally with vertical needle grooves the bottoms of which are curved so as to be considerably deeper at the center of their lengths than at their ends, in which grooves are arranged the needles $e$.

$f$ is the rotary cam cylinder supported and guided in its movements by the base ring $c$. The cam cylinder is provided with the usual cams or cam path for reciprocating the needles in their grooves in order to effect the knitting of a web.

$g$ designates the cast-offs which are adapted to be operated by a cam path on the under side of the cam plate $h$.

$i$ is an annular plate connected with the needle cylinder and provided on its upper inner surface with a groove or offset guideway for the segmental slides $j\ j'$ arranged one upon the other and primarily supported upon the reciprocatory plate $k$ so as to be moved horizontally, against the needles so as to beard the central portion of the stems of those engaged into the deepest parts of their grooves and disengage the heels thereof from the cam path of the cam cylinder, rendering the said needles inoperative, and providing means whereby the said slides may be moved and guided around the needle cylinder in opposite directions so as to gradually throw out of and bring into operation needles in the well known process of knitting heel-and-toe work.

The construction, arrangement and function of the parts thus far described will be understood by those skilled in the art without further description, though reference if need be, may be had to the patent hereinbefore mentioned for a detailed explanation and illustration thereof.

$k''$ is the driving shaft journaled in suitable bearings below the base $a$, and on which is secured a sprocket wheel $l$ around which, and a sprocket wheel $m$ on the main shaft $n$, there is passed a sprocket chain $o$. Upon the inner end of the main shaft $n$ there is secured a bevel gear wheel which engages bevel gear teeth on the lower edge of the cam cylinder, which features are not shown but are common and well understood by knitting artisans. On the driving shaft $k''$ is a crank $p$ to the outer end of which is pivoted the lower end of a rod or shaft $q$.

Figure 1:
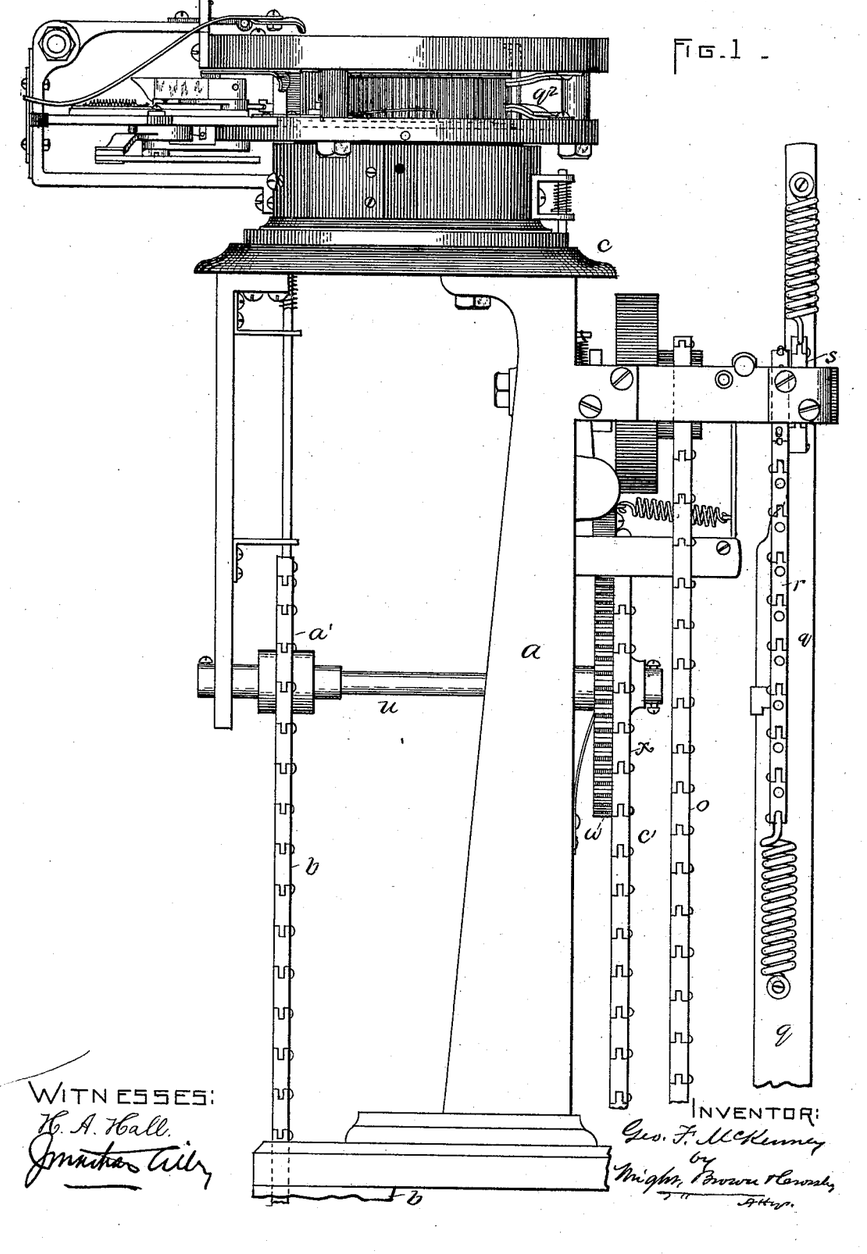
Figure 1, is what may be regarded as a front view of the upper portion of a knitting machine equipped with my improvements.
Figure 2:
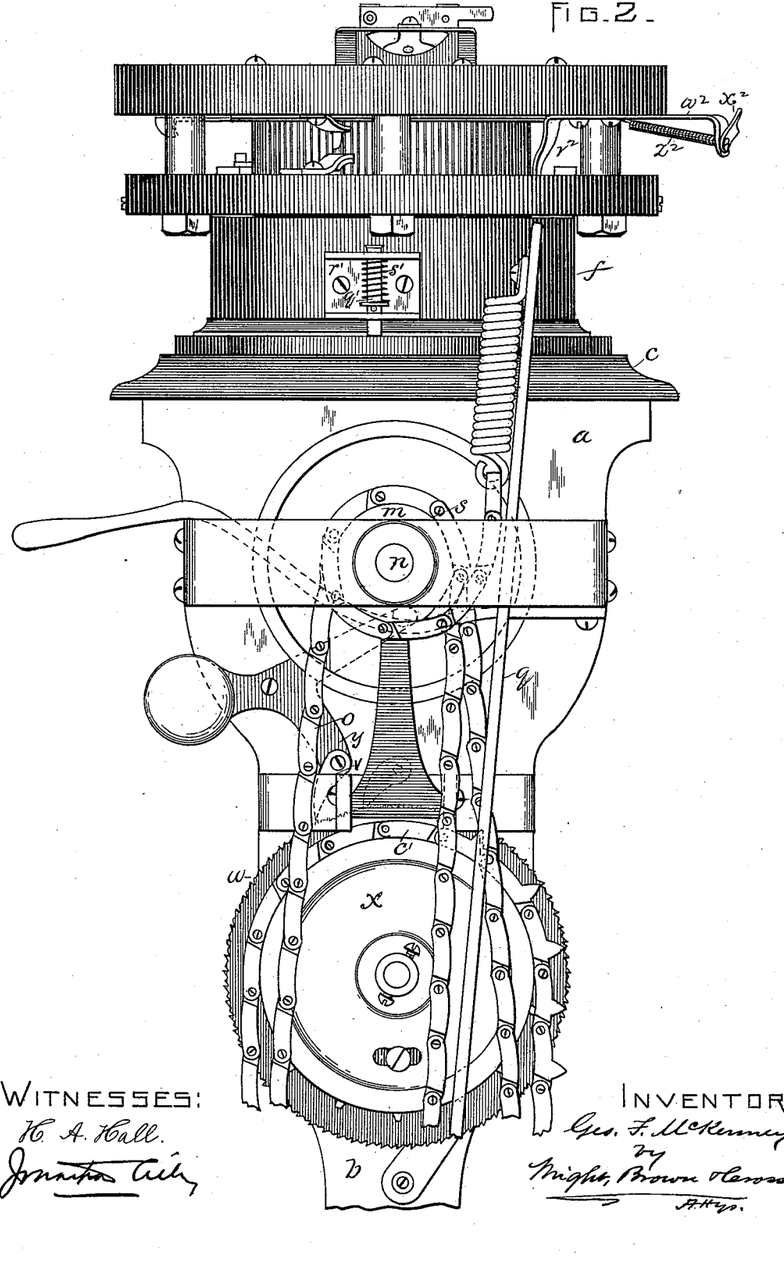
Fig. 2, is an end or side view of the same.

$r$ is a sprocket chain which is passed around the sprocket wheel $s$ on the main shaft $n$, and having a spring connection at its ends with the rod $q$, (see Fig. 1.)

$t$ is a clutch collar splined upon the shaft $n$ so as to rotate therewith, and to be moved into engagement with a clutch part of either the sprocket wheel $m$ or the like device $s$. When the clutch collar $t$ is in engagement with the clutch part of the sprocket wheel $m$ the main shaft $n$ will be rotated, so as to rotate the cam cylinder and perform the knitting of a circular web; but when the said collar $t$ is moved into engagement with the clutch part of the sprocket wheel $s$, the said main shaft will be operated through the medium of the rod $q$ and sprocket chain $r$ so as to impart a rotary-reciprocating motion to the cam cylinder as is necessary in knitting heel-and-toe work.

Figure 10:
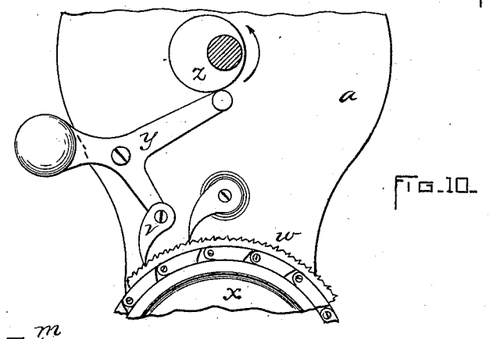
Fig. 10, is an end view partially in section of a portion of the means shown in Fig. 9.

$u$ is a shaft supported in suitable bearings below the main shaft $n$ and driven by a pawl $v$ which engages the ratchet teeth $w$ on one side of the periphery of a sprocket wheel $x$ secured to the said shaft $u$. The pawl $v$ is pivoted upon one arm of a weighted angular lever $y$ pivoted upon a stationary part of the machine, the other arm of the said angular lever being arranged to be acted upon by an eccentric $z$ on the driving shaft $n$, (see Fig. 10). Upon the said shaft $u$ is secured a sprocket wheel $a'$ similar to sprocket wheel $x$ over which respectively, are passed the sprocket chains $b'\ c'$ provided at intervals with lugs or swells $d'$ as is common in pattern chains.

On a bracket $e'$ is fulcrumed an angular lever $f'$ the end of the upright arm of which extends into a groove in the collar $t$, the end of the horizontal arm being provided with a shoe $g'$ arranged to normally rest upon the pattern chain $c'$. A spring $h'$ is connected at one end with the lever $f'$ and at the opposite end with a stationary part of the machine and operates upon the said lever with a tendency of holding the clutch collar $t$ in engagement with the clutch part of the sprocket wheel $m$, and so effect the knitting of round-and-round work. When, however, heel-and-toe work is to be performed a lug $d'$ of the sprocket chain $c'$ will pass under the shoe $g'$ raising the latter and operating the lever $f'$ so as to shift the clutch collar $t$ into engagement with the clutch part of the sprocket wheel $s$, and effect the reciprocation of the cam cylinder as before explained. To the slide plate $k$ there is pivoted upon the stud $i'$ an eccentric $j''$, connected with which there is a cam $k'$ with which there are rigidly attached the arms $l'\ m'$. (See Figs. 15, and 16.) The eccentric $j''$ is connected with a stationary part of the machine by means of a link $n'$ (shown in dotted lines) one end of which is pivoted to the said stationary part of the machine and the other to the said eccentric.

$o'$ is an arm or lever connected to the outer end of the arm $m'$ and extending at a substantially right angle to the latter; and $p'$ is an arm or lever connected at its inner end to the arm $l'$, or it may be the cam $k'$, the last mentioned arm of lever extending in substantially the same direction as the arm or lever $o'$.

Figure 12:
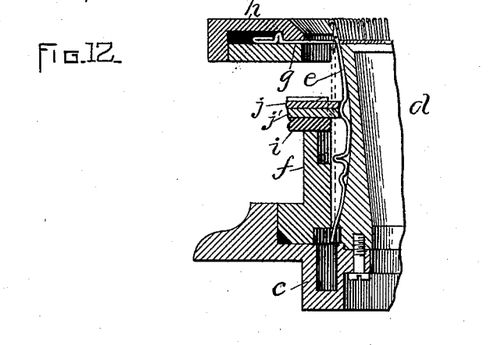
Fig. 12, is a sectional detail view through the needle cylinder, cam cylinder and portions connected therewith showing the manner of throwing the needles out of operation.
Figures 13, 14:
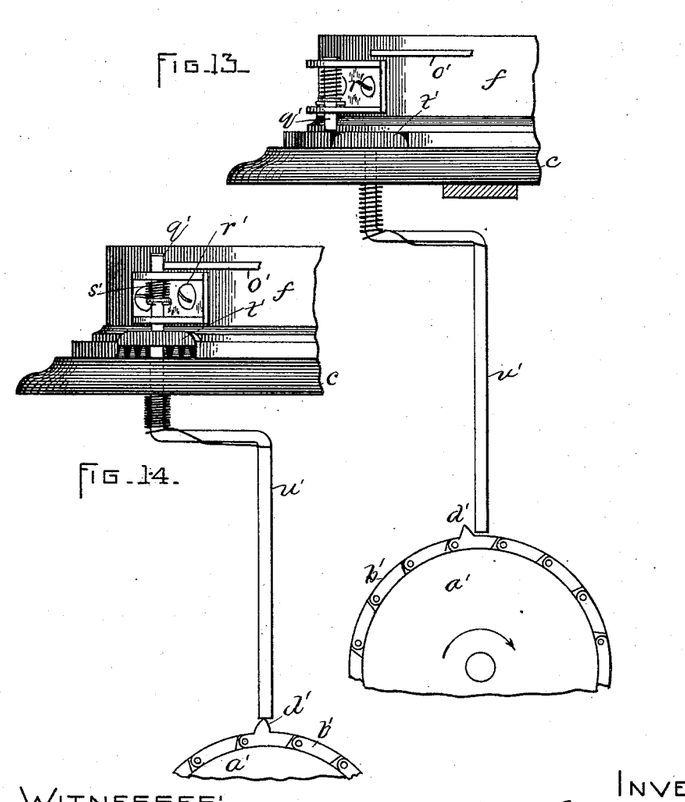
Fig. 13, is a detail in elevation showing a portion of the means employed in effecting a change of mechanism necessary to accomplish the knitting of heel-and-toe work.
Fig. 14, is a view similar to Fig. 13, showing some of the parts in different positions.
Figure 15:
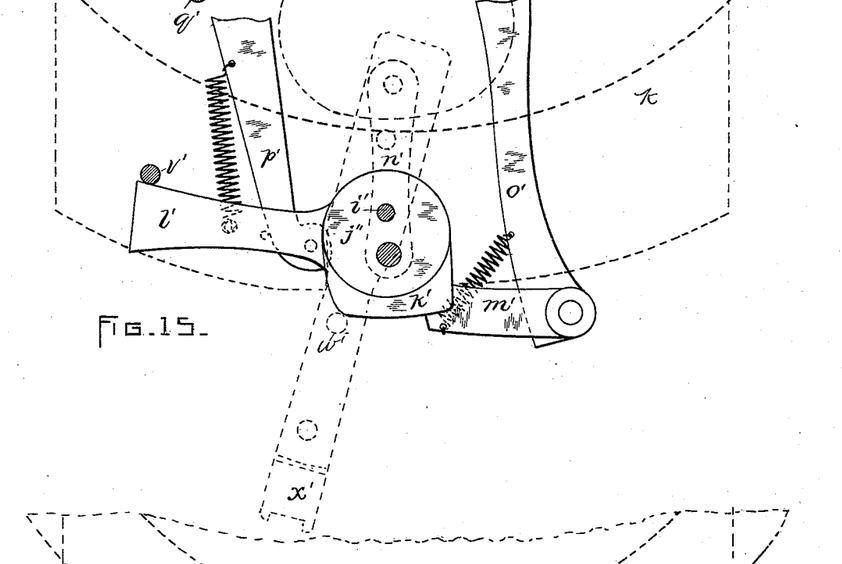
Fig. 15, is a diagram in plan and partially in section showing the position of certain devices connected with the sliding plate carrying the segmental slides when the latter are moved into position to act upon the needles and throw certain of the same out of operation.
Figure 16:
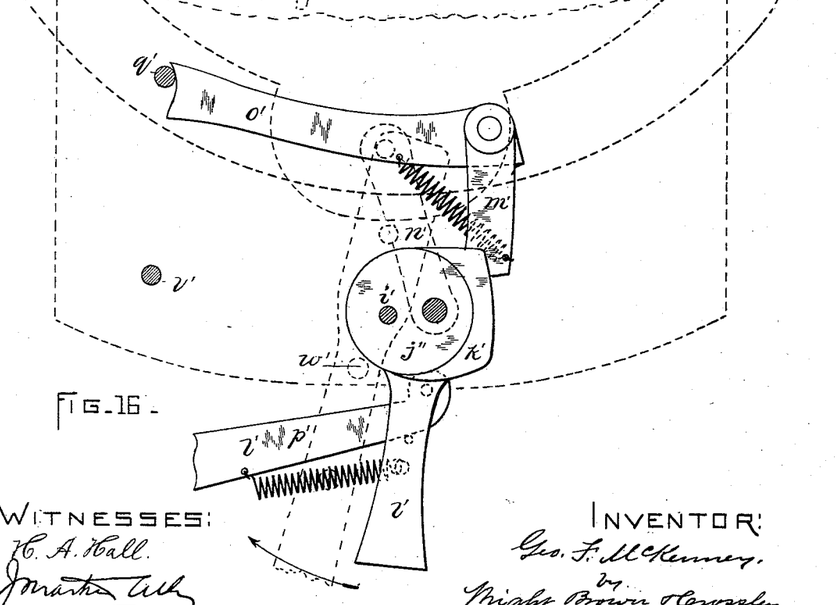
Fig. 16, is a view similar to Fig. 15, showing the parts as they will appear when the segmental slides are moved back out of contact with the needles.

When the machine is designed to perform round-and-round knitting as in the production of leg-and-foot work, the parts will be in the position in which they are represented in Fig. 16, with the inner end of the arm or lever $o'$ in the orbit though in a plane above a pin $q'$ arranged so as to slide vertically in bearings of a bracket $r'$ connected with the cam cylinder, the said pin being held normally down so as not to come into contact with the end of the lever $o'$ by a spring $s'$. In the orbit of the lower end of the said pin $q'$ is a cam or shoe $t'$ secured to the upper end of a vertically sliding rod $u'$, the lower end of which rests upon the pattern chain $b'$ which passes around the sprocket wheel $a'$, (see Figs. 13, and 14.) In the knitting of circular work the said rod $u'$ will rest upon the plain chain $b'$ as in Fig. 13; but when it is desired to move the slide plate $k$ and its connected segmental slides inward so as that the latter may act upon the needles, as is shown in Fig. 12, a lug $d'$ of the said pattern chain will be brought under the lower end of the rod $u'$ as is indicated in Fig. 1, raising the same, the cam or shoe $t'$ and the pin $q'$ so that the latter will engage the inner end of the lever $o'$ which will be in the position in which it is represented in Fig. 16, and move it, eccentric $j''$ and all of the parts connected with the latter to the position in which they are represented in Fig. 15. By the means and in the manner described the slide plate $k$ will have been moved inward through the medium of the link $n'$, so that the pivotal point of the eccentric $j''$ and the pivots connecting the ends of the link $n'$ will be in a line substantially radial to the axis of the cam and needle cylinders, the arm $l'$ will be brought up against the stop-pin $v'$, and the inner end of the arm or lever $p'$ will have been brought into the orbit of the pin $q'$, which, meanwhile has passed off from the cam or shoe $t'$ and been depressed by its spring $s'$. In this operation the cam $k'$ acting against a pin $w'$ (see dotted lines, Figs. 15, and 16,) projecting down from a radially sliding arm $x'$ and held normally back by a spring $y'$, will move the said arm outward against the tension of its spring for a purpose to be presently explained. The outer end of the arm $x'$ is bifurcated or notched as at $z'$. When it is desired to resume circular work, as when after a heel or toe shall have been completed, a lug $d'$ of the pattern chain $d'$ coming under the end of the rod $u'$ will raise the same, the attached cam $t'$ and the pin $q'$ so as to bring the latter into contact with the inner end of the lever $p'$ moving the same, the eccentric $j''$ and all of its connections in a contrary direction to that they were moved by the lever $o'$, carrying the pivotal connections of the link $n'$ "off-center" with the pivot $i'$ of the eccentric, and allowing the resilient action of the needles to restore the parts to the position in which they are represented in Fig. 15. But a slight movement of the lever $p'$ is necessary to move it "off center" in order to allow the resilient force of the needles to act thereon as described.

The segmental slides $j\ j'$ are provided on their outer edges or peripheries with notches as shown, and doubled ended pawls $a^2\ a^3$ are arranged to engage therewith the former with the slide $j$ and the latter with the slide $j'$. The pawl $a^3$ (which is the lower pawl, the slide $j'$ being below the slide $j$) is rigidly connected with or forms an integral part of the pivot pin $b^2$, which extends through a pivot sleeve with which the upper pawl $a^2$ is connected. The pivot pin $b^2$ has a spring arm $c^2$ connected therewith, while a T-shaped arm $c^3$ is connected with the pivot-sleeve of pawl $a^2$, the said arms and pivotal connections of the said pawls being supported upon the lever $d^2$, fulcrumed at $e^2$ upon the plate $k$, the sliding bar $x$ being supported in guideways in the lever $d^2$. The outer edge of the T-shaped arm is provided with notches $f^2\ g^2$, with either of which the catch-block $h^2$ on the outer end of the spring arm $c^2$ may engage.

By the description given it will be seen that if, with the catch-block $h^2$ of the spring lever or arm $c^2$ in engagement with either of the notches $f^2$ or $g^2$, the lever $d^2$ should be oscillated on its fulcrum $e^2$, the pawls $a^2\ a^3$ would be operated so as to move the segmental slides $j\ j'$ step by step in opposite directions, and by changing the position of the arm $c^2$ with respect to the arm $c^3$ the positions of the pawls $a^2\ a^3$ will be reversed and the slides moved back in reverse directions.

Figure 3:
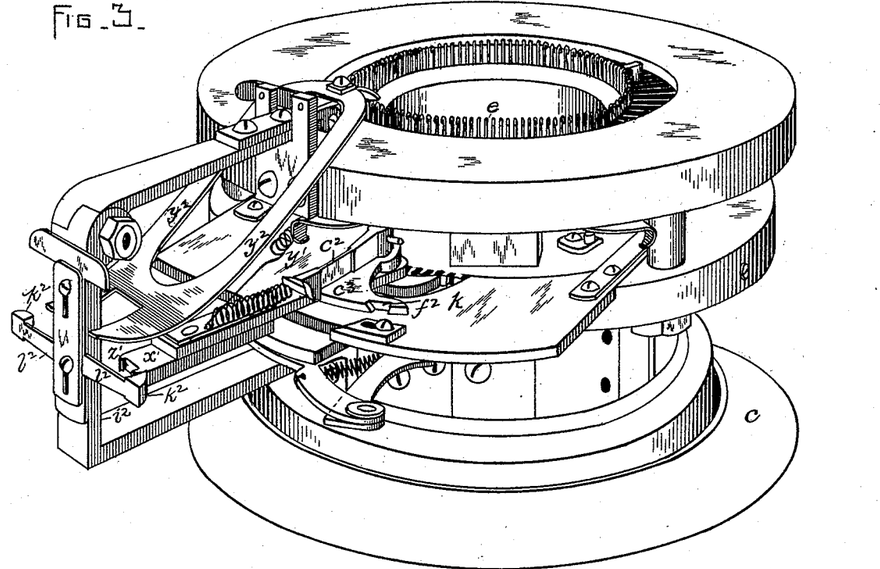
Fig. 3, is a perspective view of the head.
Figure 4:
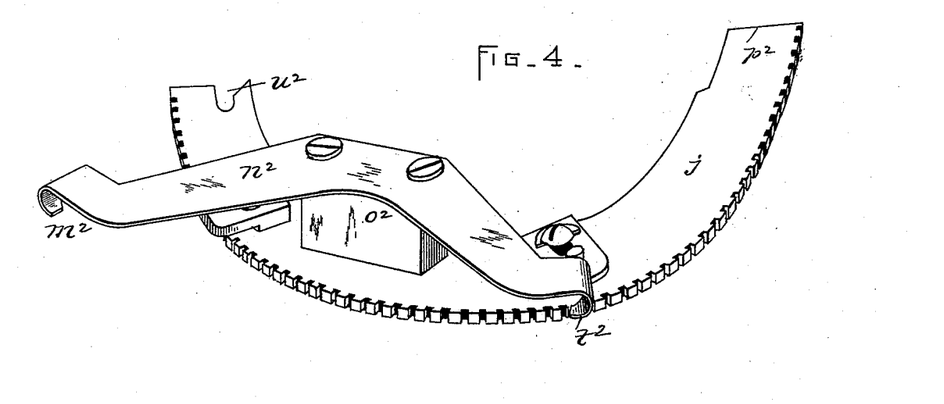
Fig. 4, is a perspective view of means connected with one of the segmental slides for operating upon contrivances for shifting the piece of the pawls, and effecting a contrary movement of the slides.
Figure 5:
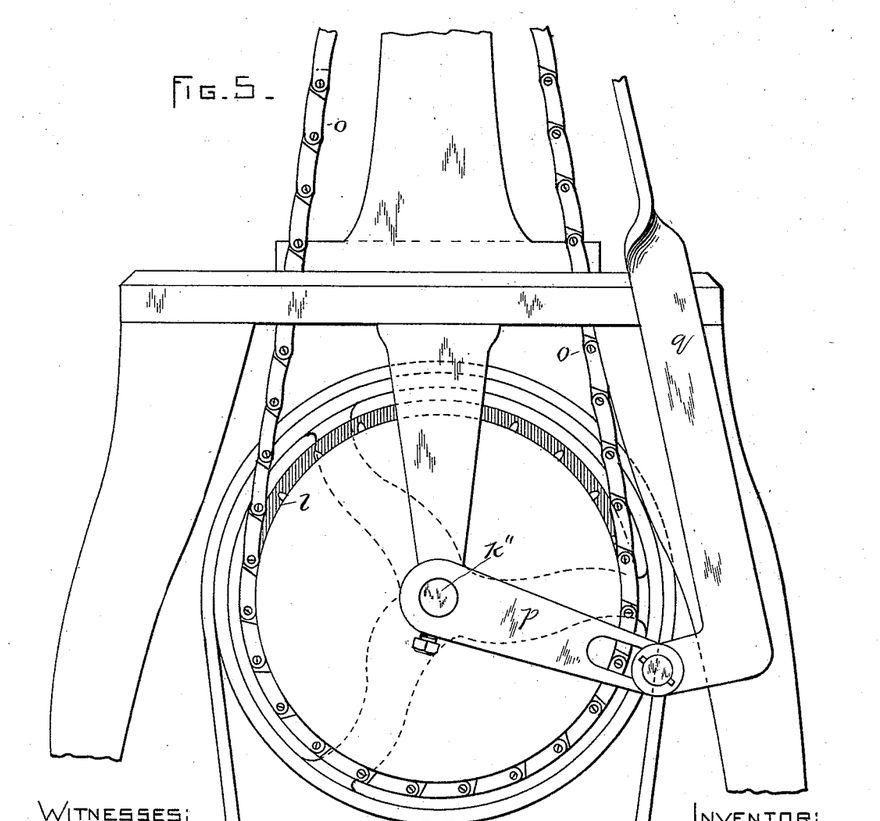
Fig. 5, is a side view of the lower portion of the machine shown in Figs. 1, and 2.
Figure 6:
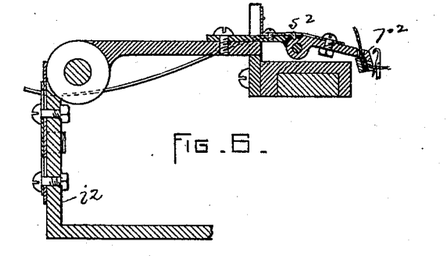
Fig. 6, is a longitudinal sectional view through the yarn guide and its connections, showing the former in lowered position.
Figure 7:
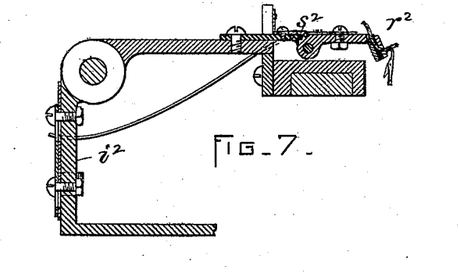
Fig. 7, is a view similar to Fig. 6 showing the yarn guide as raised.
Figure 8:
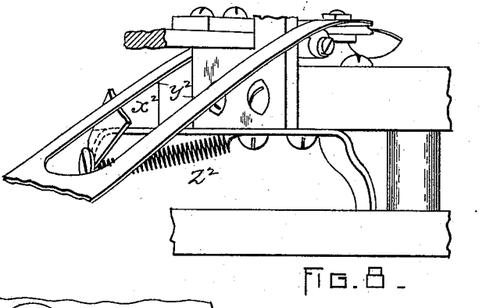
Fig. 8, is a perspective view of means for effecting the lowering of the yarn guide from the position in which it is represented in Fig. 7, to that in which it is shown in Fig. 6.
Figures 9, 11:
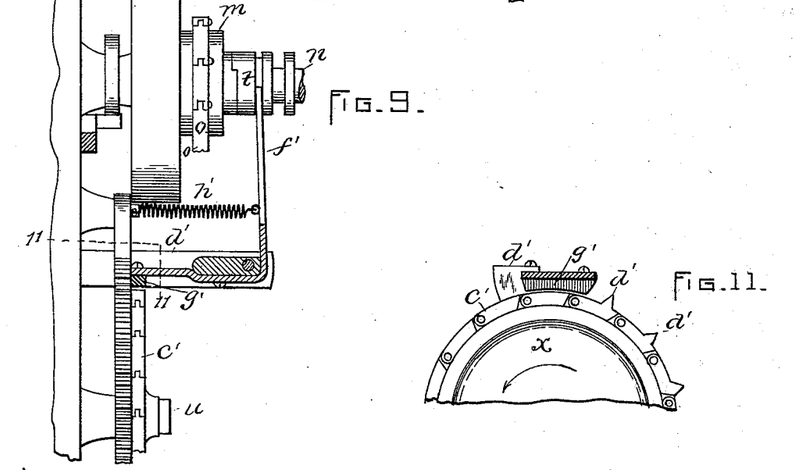
Fig. 9, is a front elevation partially in section showing the means for effecting a change in the movements of the cam cylinder from rotary to reciprocatory motion and vice versa.
Fig. 11, is a sectional detail view taken on the line 11, Fig. 9.
Figure 17:
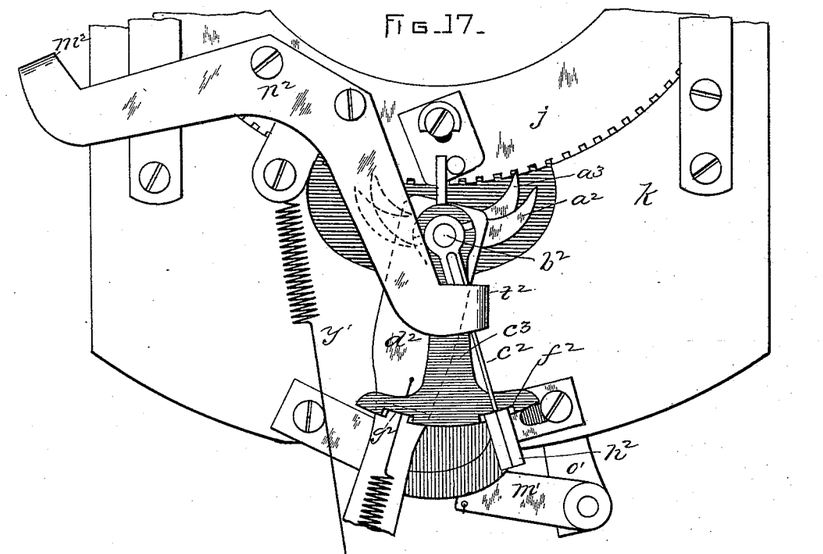
Fig. 17, is a plan view of the position of the pawls and connecting parts as they will appear upon the commencement of widening in knitting heel-and-toe work.
Figure 18:
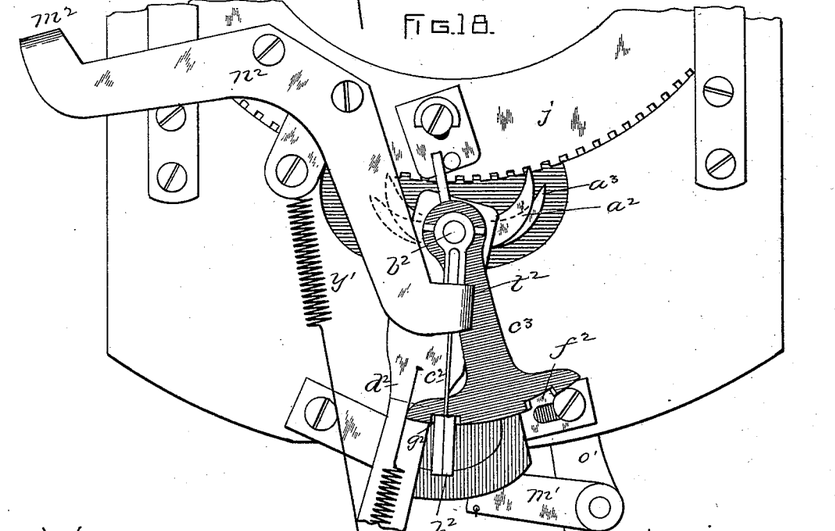
Fig. 18, is a view of some parts shown in Fig. 17, in a different position.
Figure 19:
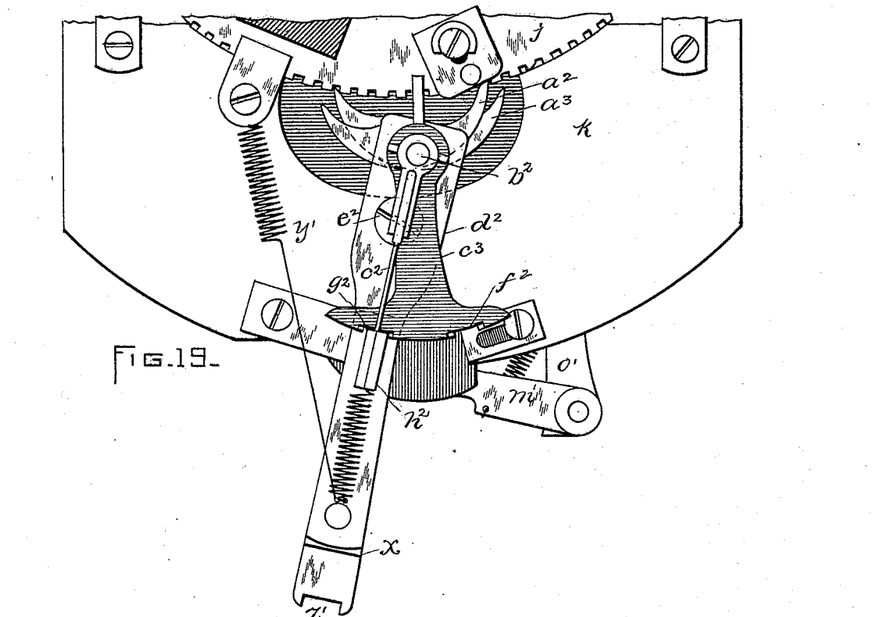
Fig. 19, is a plan view of the parts shown in Figs. 17, and 18, with certain devices represented in the last mentioned figures removed.
Figure 20:
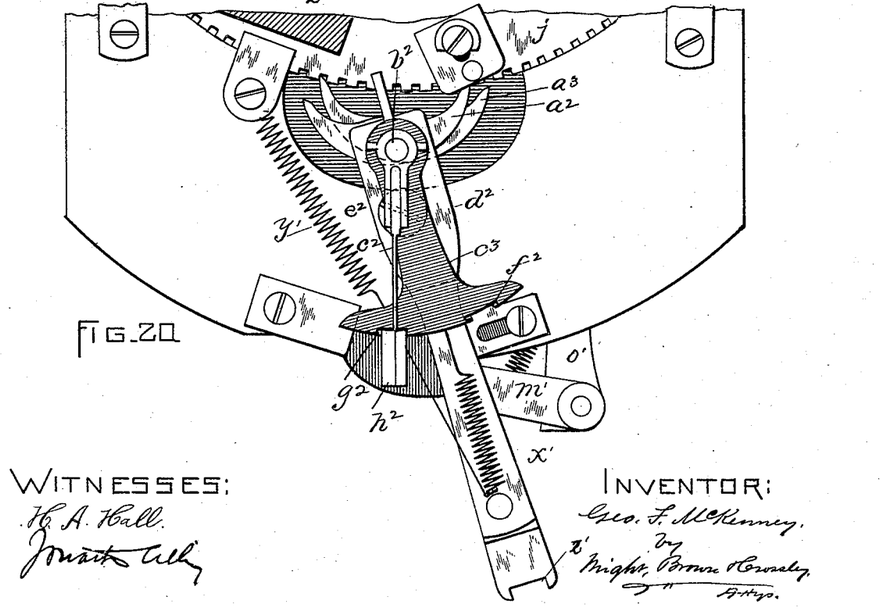
Fig. 20, is a view similar to Fig. 19, showing the lever for operating the pawls in a different position.
Figure 21:
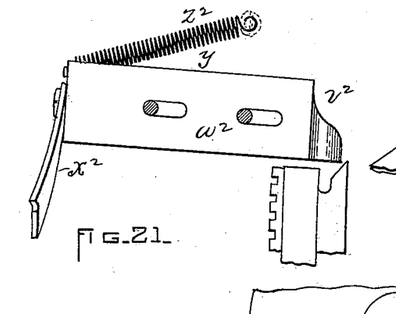
Fig. 21, is a detail view showing the means for acting upon the yarn guide to lower it from the raised position in which it is represented in Fig. 6, to the lowered position in which it is shown in Fig. 7.

Supposing the parts just described to be in the position in which they are represented in Fig. 20, and the motion of the cam cylinder to have been changed from rotary to reciprocatory, and the bar $x'$ to have been moved outward as represented in Figs. 19, and 20, as the cam cylinder moves around to its extreme limit, the upright portion $i^2$ of the yarn-carrier support (Fig. 3) will come into contact with the said bar $x$ and its momentum will be overcome thereby. The catch $k^2$ on one end of a spring bar $l^2$ supported on the upright part $i^2$ of the yarn carrier support and at a right angle thereto will have passed the outer end of the bar $x$ so that as the cam cylinder is turned back the said catch will engage the notched end of said bar moving the lever $d^2$ from the position in which it is shown in Fig. 20 to that in which it is represented in Fig. 19, effecting the movement of the slide $j$ to the extent of the space between two needles in the needle cylinder and throwing one needle out of operation. This operation will be repeated at the extreme limit of movement of the cam cylinder in the opposite direction upon the slide $j'$ until all of the needles have been thrown out of operation that it is desired to render inoperative. The hooked end $m^2$ of the bar $n^2$ supported upon a block $o^2$ of the segmental slide $j$, will now be brought into engagement with the spring arm $c^2$ and move the said arm so as to cause the catch block $h^2$ to be moved out of the notch $g^2$ into notch $f^2$ of the arm $c^3$, which will have the effect, as before explained, of changing the position of the pawls so that the arms thrown previously out of engagement with the segmental slides will be brought into engagement therewith, with the result, in the reciprocating movement of the cam cylinder, of moving the slides back in a direction the reverse of that in which they were previously moved, step by step, permitting the needles to be brought into operation in the same order they were in when they were thrown out of use. When the slide $j$ reaches the extreme limit of its movement in the process of narrowing or retiring the needles, the end $p^2$ thereof (Fig. 4) will pass under a pin $q^2$ (Fig. 1) raising the same for the time being so that as the yarn guide $r^2$ passes thereover, it will be raised from the position in which it is represented in Fig. 6, to that in which it is shown as occupying in Fig. 7, being locked in its raised position by a spring latch $s^2$, and which engages a notch on the heel or base of the yarn guide, as shown. The object of raising the yarn carrier, as described, is to effect the passing of the yarn back of the needle brought into operation, so that when the yarn carrier moves forward again it will, as it were, wrap the yarn around the needle brought into operation and so effect the closing of the "eyelet holes" so called, which would otherwise occur on the line of widening and narrowing in the production of a round heel or toe. When the yarn is wrapped as it were, around the needle shank when it is first brought into action in widening, no open mesh or "eyelet hole" is left where such stitch is formed, as would be the case where the thread simply passed back and forth as it were, in front of the needle brought into action to effect a widening of the fabric. The segmental slides will be moved back to normal position, when all of the needles shall have been brought into operation again, which were by the step-by-step movement of the segmental slides thrown out of operative position. The hooked end $t^2$ of the bar $n^2$ will engage the spring arm $c^2$ and move the same from the position in which it is represented in Fig. 17, to that in which it is shown as occupying in Fig. 18, so that the parts will be again in position to commence widening at the next time that the knitting of a heel or toe is commenced. When the slide $j$ is moved back to the position last mentioned, an incline $u^2$ on the end thereof will be brought into engagement with the angular portion $v^2$ of a sliding bar $w^2$, on the outer end of which is an upwardly projecting arm $x^2$ (Fig. 21) which will pass under and engage the spring plate $v^2$ connected at its inner end with the yarn guide $r^2$, and raise the outer end of the said spring plate and lower the end thereof which, as shown in Fig. 1, extends out over and rests upon the yarn guide forward of its pivotal point and depresses or lowers the said yarn guide to the position represented in Fig. 6, with the effect of feeding the yarn into the hooks of the needles as before.

$z^2$ (Fig. 21) is a spring which operates to restore the plate $w^2$ to its normal position.

Having thus described the nature of my invention, and explained a way of constructing and using the same, though without attempting to set forth all of the forms in which it may be made, or all of the modes of its employment, I declare that what I claim is:

1. A means for effecting the reciprocating movement of the cam-cylinder comprising in its construction a crank on the driving shaft, a sprocket wheel on the main shaft, a rod pivoted at one end to the said crank, and a chain passed around the said sprocket wheel and connected at its ends to the said rod, as described.

2. A means for changing the movement of the cam-cylinder, comprising in its construction a rotary clutch part loose on the main shaft, a grooved clutch collar splined thereon, a sprocket wheel loose on the said shaft and provided with a clutch part, a crank on the driving shaft, a rod pivoted at one end to the said crank, a chain passed around the said sprocket wheel and engaged at its ends with the said rod, a movable pattern mechanism, an angular lever arranged to at one end engage the groove of the clutch collar and at the other end to be engaged by the pattern mechanism, as described.

3. As a means for effecting the revolution of the cam-cylinder, discontinuing the same and controlling the changes of motion from the main shaft, comprising in its construction a rotary clutch part loose on the main shaft, a grooved clutch collar splined on the said shaft, a sprocket wheel having a ratchet wheel connected therewith, a pattern chain on the said sprocket wheel, an angular lever arranged to at one end engage the groove of the clutch-collar and at the other end to be engaged by the pattern-chain, a pawl to engage and move the said ratchet-wheel, a lever to which the said pawl is pivoted, and an eccentric on the main shaft to operate the said lever, as described.

4. A means to engage the needles and bend the same to throw them out of engagement with the cam path of the cam cylinder, comprising in its construction segmental slides, the slide plate carrying the same, an eccentric pivoted upon the said slide plate, a link pivoted at one end to a stationary part of the machine and at the other end to the said eccentric, an arm or lever connected with the said eccentric and adapted to move the same, and a movable pin on the cam cylinder, adapted to be operated to engage the said lever and move the latter so as to effect a movement of the slide plate and eccentric slides, as described.

5. A means to engage the needles and bend the same to throw them out of engagement with the cam path of the cam cylinder, comprising in its construction segmental slides, the slide plate carrying the same, an eccentric pivoted upon the said slide plate, a link pivoted at one end to a stationary part of the machine and at the other end to the said eccentric, an arm or lever connected with the said eccentric and adapted to move the same, and a movable pin on the cam cylinder, a movable rod provided at its upper end in the orbit or path of the said pin with a cam shoe, a movable pattern device upon which the said rod rests, and a spring to depress the said pin, as described.

6. A means for engaging the needles to bend the same and release them to throw them out of and allow them to be brought into action, comprising in its construction segmental slides, the slide plate carrying the same, an eccentric pivoted upon the said slide plate, a link pivoted at one end to a stationary part of the machine and at the other end to the said eccentric, two arms or levers connected with the said eccentric and adapted to move the same, and a movable pin on the cam cylinder, adapted to be operated to engage one of the arms of the said eccentric and move the latter, the slide plate and segmental slides into engagement with the needles, and bring the other arm into the orbit of the said movable pin to be engaged by the latter at its next operation to release the needles and allow them to be again brought into operation, as described.

7. A knitting machine, comprising in its construction the peripherically notched segmental slides for engaging the needles to render the same inoperative, an extensible arm or lever $x'$, double acting pawls for engaging the notches of the said slides adapted to be actuated by said lever, an upright on the cam cylinder for engaging the said arm or lever and being stopped thereby, and a catch connected with the said upright to engage the said arm or lever and move it back to actuate the said pawls, as described.

8. A knitting machine comprising in its construction the peripherically notched segmental slides for engaging the needles to render the same inoperative, an extensible arm or lever $x'$, double acting pawls for engaging the notches of the said slides adapted to be actuated by the said lever, a T-shaped arm $c^3$ provided with the notches $g^2$ $f^2$ connected with one of the said pawls to control the position of the same, the spring arm $c^2$ connected with the other of the said pawls to control its position, and provided with the catch block $h^2$ for engaging the notches in the said T-shaped arm, the hook-bar $n^2$ supported upon one of the segmental slides to engage the said spring arm, to move the catch block of the same from one notch in the T-shaped arm to the other, an upright on the cam cylinder for engaging the extensible arm or lever and being stopped thereby, a catch connected with said upright to engage the said extensible arm or lever and move it back to actuate the said pawls, as described.

In testimony whereof I have signed my name to this specification, in the presence of two subscribing witnesses, this 19th day of March, A. D. 1892.

GEORGE F. McKENNEY.

Witnesses:
S. C. ROBINSON,
W. L. SWAIN.